United States Patent
Chen et al.

(10) Patent No.: US 11,783,449 B2
(45) Date of Patent: Oct. 10, 2023

(54) METHOD FOR ADJUSTING DISPLAYED CONTENT BASED ON HOST POSTURE, HOST, AND COMPUTER READABLE STORAGE MEDIUM

(71) Applicant: HTC Corporation, Taoyuan (TW)

(72) Inventors: Po-Hung Chen, Taoyuan (TW); Yi-Hsin Chang, Taoyuan (TW); Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/858,092

(22) Filed: Jul. 6, 2022

(65) Prior Publication Data
US 2023/0186431 A1 Jun. 15, 2023

Related U.S. Application Data

(60) Provisional application No. 63/287,542, filed on Dec. 9, 2021.

(51) Int. Cl.
*G06T 3/60* (2006.01)
*G06F 3/01* (2006.01)

(52) U.S. Cl.
CPC ............ *G06T 3/60* (2013.01); *G06F 3/012* (2013.01); *G06F 3/017* (2013.01)

(58) Field of Classification Search
CPC ..... G06T 3/60; G06T 7/74; G06T 3/20; G06F 3/012; G06F 3/017; G06F 1/1626; G06F 3/0346; G06V 40/165; G10L 25/78
See application file for complete search history.

(56) References Cited

U.S. PATENT DOCUMENTS

| | | | |
|---|---|---|---|
| 2009/0169058 A1* | 7/2009 | Chen | G06T 7/74 382/106 |
| 2010/0066763 A1* | 3/2010 | MacDougall | G06F 1/1626 345/656 |
| 2011/0074822 A1* | 3/2011 | Chang | G06F 1/1626 345/660 |
| 2011/0298829 A1* | 12/2011 | Stafford | G06V 40/165 345/659 |
| 2015/0128075 A1* | 5/2015 | Kempinski | G06F 3/012 715/765 |
| 2015/0302867 A1* | 10/2015 | Tomlin | G10L 25/78 704/270 |
| 2017/0263056 A1* | 9/2017 | Leppanen | G06F 3/012 |
| 2018/0018946 A1* | 1/2018 | Park | G06F 3/0346 |
| 2020/0103962 A1* | 4/2020 | Burns | G06T 3/20 |

* cited by examiner

*Primary Examiner* — Richard J Hong
(74) *Attorney, Agent, or Firm* — JCIPRNET

(57) ABSTRACT

The embodiments of the disclosure provide a method for adjusting a displayed content, a host, and a computer readable storage medium. The method includes: displaying a visual content, wherein the visual content comprises a first virtual object and a second virtual object; and in response to determining that a synchronization mode associated with the first virtual object is activated, automatically adjusting a first posture of the first virtual object at least based on a host posture of the host and maintaining a second posture of the second virtual object.

19 Claims, 3 Drawing Sheets

METHOD FOR ADJUSTING DISPLAYED CONTENT BASED ON HOST POSTURE, HOST, AND COMPUTER READABLE STORAGE MEDIUM

CROSS-REFERENCE TO RELATED APPLICATION

This application claims the priority benefit of U.S. provisional application Ser. No. 63/287,542, filed on Dec. 9, 2021. The entirety of the above-mentioned patent application is hereby incorporated by reference herein and made a part of this specification.

BACKGROUND

1. Field of the Invention

The present disclosure generally relates to a content adjustment mechanism, in particular, to a method for adjusting a displayed content, a host, and a computer readable storage medium.

2. Description of Related Art

When a user of the virtual reality (VR) service is watching multimedia contents (e.g., videos/movies) in the VR world provided by the head-mounted display (HMD), the user 399 may want to watch the multimedia contents in a more relaxed posture, such as lying in a recumbent position.

In this case, if the window for showing the multimedia content in the VR world does not rotate/tilt along with the movement of the user 399's head, the user 399 may need to watch the multimedia content in a less comfortable way since the window remains upright but the view angle of the user 399 becomes relatively tilted.

SUMMARY OF THE INVENTION

Accordingly, the disclosure is directed to a method for adjusting a displayed content, a host, and a computer readable storage medium, which may be used to solve the above technical problems.

The embodiments of the disclosure provide a method for adjusting a displayed content, adapted to a host. The method includes: displaying a visual content, wherein the visual content comprises a first virtual object and a second virtual object; and in response to determining that a synchronization mode associated with the first virtual object is activated, automatically adjusting a first posture of the first virtual object at least based on a host posture of the host and maintaining a second posture of the second virtual object.

The embodiments of the disclosure provide a host including a storage circuit and a processor. The storage circuit stores a program code. The processor is coupled to the non-transitory storage circuit and accesses the program code to perform: displaying a visual content, wherein the visual content comprises a first virtual object and a second virtual object; and in response to determining that a synchronization mode associated with the first virtual object is activated, automatically adjusting a first posture of the first virtual object at least based on a host posture of the host and maintaining a second posture of the second virtual object.

The embodiments of the disclosure provide a non-transitory computer readable storage medium, the computer readable storage medium recording an executable computer program, the executable computer program being loaded by a host to perform steps of: displaying a visual content, wherein the visual content comprises a first virtual object and a second virtual object; and in response to determining that a synchronization mode associated with the first virtual object is activated, automatically adjusting a first posture of the first virtual object at least based on a host posture of the host and maintaining a second posture of the second virtual object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
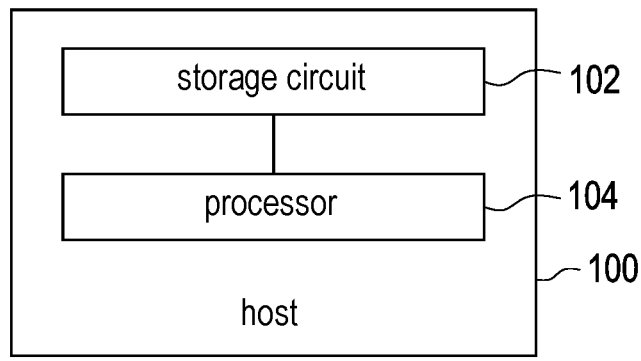
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any device capable of performing tracking functions (e.g., inside-out tracking and/or outside-in tracking) on one or more to-be-tracked objects (e.g., the hands of the user 399 of the host 100 and/or the handheld controllers connected with the host 100) within the field of view (FOV) of the host 100. In the embodiments of the disclosure, the FOV can be an image-capturing range of one or more camera (e.g., tracking camera) on the host 100. When the to-be-tracked objects (e.g., the hands and/or the handheld controllers) is within the FOV, the cameras on the host 100 may capture images of the to-be-tracked objects, and the host 100 may track the pose of each to-be-tracked object based on the captured images, but the disclosure is not limited thereto.

In the embodiments of the disclosure, the host 100 can be an HMD for providing reality services to the user 399 thereof, wherein the reality services include, but not limited to, a virtual reality (VR) service, an augmented reality (AR) service, an extended reality (XR), and/or a mixed reality, etc. In these cases, the host 100 can show the corresponding visual contents for the user 399 to see, such as VR/AR/XR/MR visual contents.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or program codes stored in the storage circuit 102 to implement the method for adjusting a displayed content provided in the disclosure, which would be further discussed in the following.

Figure 2:
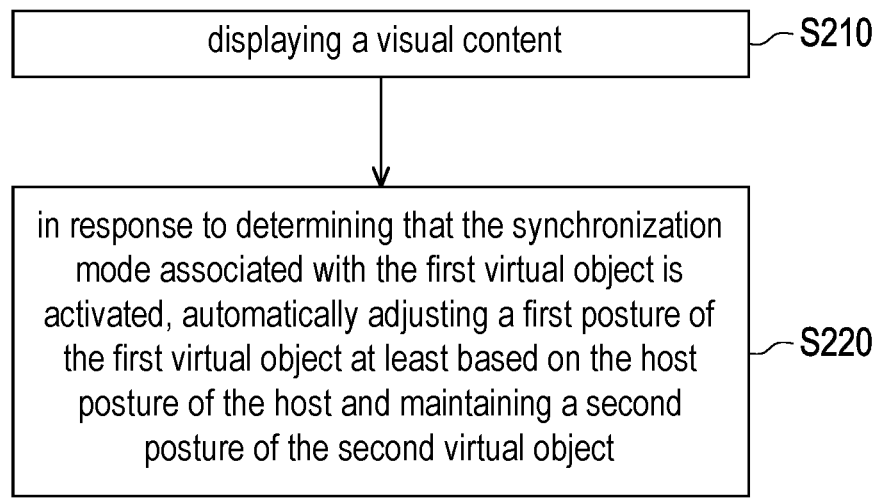
FIG. 2 shows a flow chart of the method for adjusting a displayed content according to an embodiment of the disclosure.

See FIG. 2, which shows a flow chart of the method for adjusting a displayed content according to an embodiment of the disclosure. The method of this embodiment may be executed by the host 100 in FIG. 1, and the details of each step in FIG. 2 will be described below with the components shown in FIG. 1. For better explaining the concept of the disclosure, FIG. 3 would be used as an illustrative example, wherein FIG. 3 shows an application scenario according to an embodiment of the disclosure.

In step S210, the processor 104 displays a visual content 300, wherein the visual content 300 may exemplarily include a first virtual object 310 and a second virtual object 320. In one embodiment, the second virtual object 320 can be understood as the virtual objects in the virtual environment (e.g., a VR environment) of the visual content other than the first virtual object 310. In one embodiment, the first virtual object 310 may be a foreground object, and the second virtual object 320 may be a background object, but the disclosure is not limited thereto.

Figure 3:
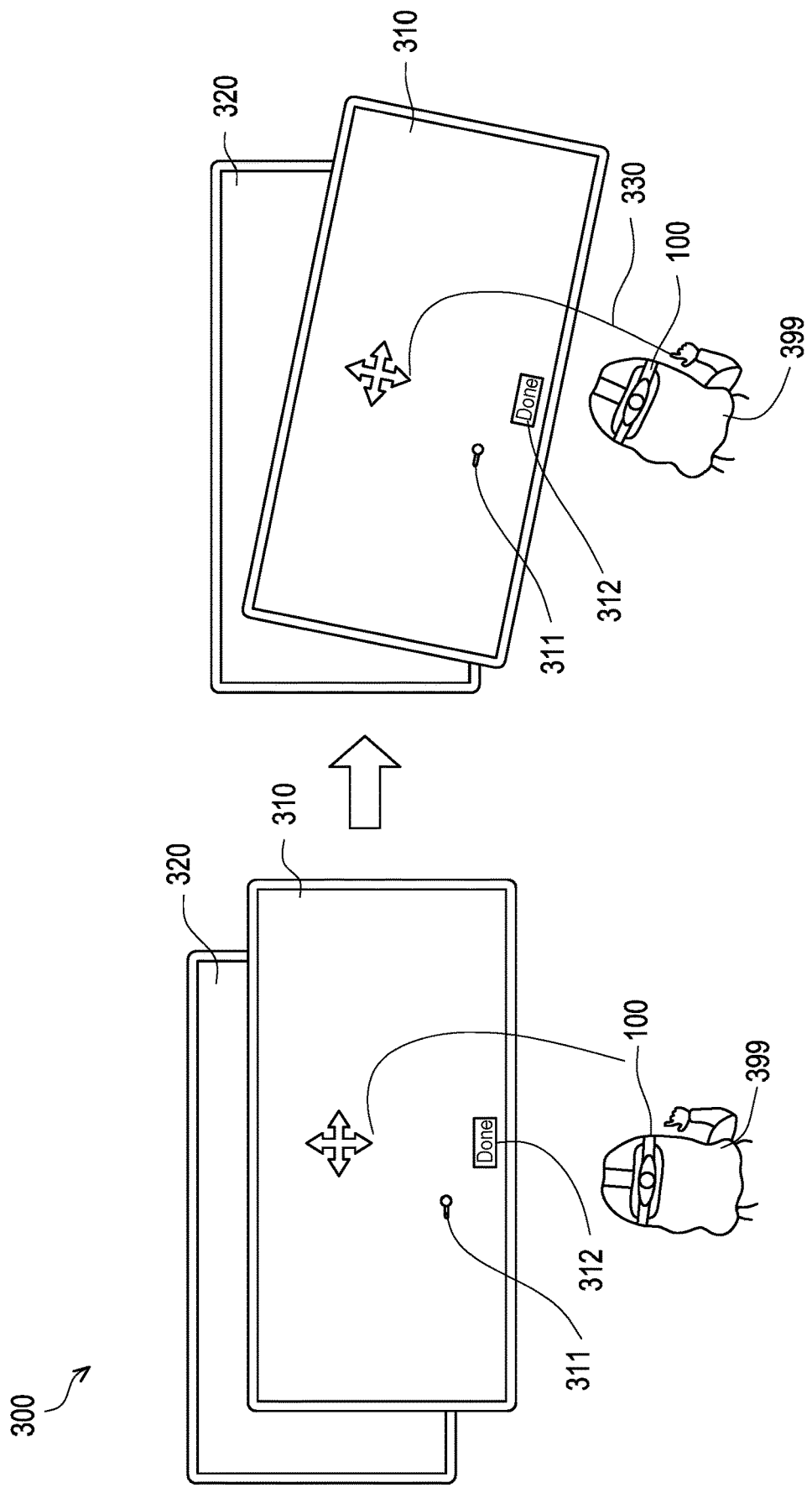
FIG. 3 shows an application scenario according to an embodiment of the disclosure.

In FIG. 3, the first virtual object 310 may be a window for showing multimedia contents, such as videos/movies/images, etc.

As mentioned in the above, if the user 399 wearing the host 100 (e.g., the HMD) tilts his/her head while watching the multimedia, the user 399 may not have a satisfying visual experience since the window remains upright. Therefore, the embodiments of the disclosure allow the user 399 to activate a synchronization mode associated with the required virtual object, such that the posture of this virtual object can be synchronized with the host posture of the host 100 (which can be understood as the posture of the head of the user 399). In the embodiments of the disclosure, the synchronization between the posture of the virtual object and the host poster of the host 100 may include, but not limited to, the synchronization between the distances, depths, and/or the orientations of the virtual object and the host posture, but the disclosure is not limited thereto.

In some embodiments, the host posture of the host 100 can be determined by, for example, the motion detection element (e.g., an inertia measurement unit) on the host 100. In some embodiments, the host posture of the host 100 can be also determined by performing particular tracking, such as the outside-in tracking and/or the inside out tracking (e.g., simultaneous localization and mapping), but the disclosure is not limited thereto.

In the following embodiment, the first virtual object 310 would be assumed to be the virtual object whose synchronization mode is activated, but the disclosure is not limited thereto.

In various embodiment, the synchronization mode of the first virtual object 310 may be activated in different ways. For example, the first virtual object 310 may be designed with a particular button for the user 399 to activate the synchronization mode of the first virtual object 310. For another example, the user 399 may activate the synchronization mode of the first virtual object 310 via performing some particular hand gesture when the first virtual object 310 is in the foreground of the visual content 300, but the disclosure is not limited thereto.

In FIG. 3, the appearance of the first virtual object 310 can be adjusted to be as shown in FIG. 3, but the disclosure is not limited thereto.

In step S220, in response to determining that the synchronization mode associated with the first virtual object 310 is activated, the processor 104 automatically adjusts a first posture of the first virtual object 310 at least based on the host posture of the host 100 and maintaining a second posture of the second virtual object 320.

In one embodiment, the second posture of the second virtual object 320 may be a default posture/position/orientation of the second virtual object 320 in the virtual environment, which may be determined by the corresponding application (e.g., a game application), but the disclosure is not limited thereto.

In the embodiment where the second virtual object 320 includes the virtual objects in the virtual environment other than the first virtual object 310, the second posture of the second virtual object 320 may be a default posture/position/orientation of each virtual object other than the first virtual object 310, which may be determined by the corresponding application, but the disclosure is not limited thereto.

In a first embodiment, the processor 104 may determine whether the host posture is tilted. If yes, the processor 104 may accordingly tilt the first posture of the first virtual object 310 as exemplarily shown on the right of FIG. 3.

In a variation of the first embodiment, the processor 104 may provide an option 311 in the visual content 300 in response to determining that the synchronization mode associated with the first virtual object 310 is activated. In FIG. 3, the option 311 may be, for example, a toggle within the first virtual object 310, but the disclosure is not limited thereto.

In the embodiment, the option 311 may be used for allowing the user 399 to tilt the first virtual object 310 along with the host posture of the host 100. That is, if the user 399 wants to tilt the first virtual object 310 via tilting the host posture of the host 100, the user 399 may select/enable the option 311. In this case, the processor 104 may tilt the first posture of the first virtual object 310 according to a tilting movement of the host posture of the host 100. For example, when the host 100 is detected to be tilting to the right by a certain degree, the processor 104 may accordingly tilt the first posture of the first virtual object 310 to the right by the certain degree, such as the scenario exemplarily shown on the right of FIG. 3. For another example, when the host 100 is detected to be tilting to the left by another degree, the processor 104 may accordingly tilt the first posture of the first virtual object 310 to the left by the another degree, but the disclosure is not limited thereto.

On the other hand, if the user 399 merely wants to move the first virtual object 310 around in the visual content 300, the user 399 may not select/enable the option 311, but the disclosure is not limited thereto. In this case, the user 399 can horizontally and/or vertically move the first virtual object 310 to any desired position in the visual content 300 via, for example, a hand gesture and/or the handheld controller connected to the host 100.

In an embodiment where the user 399 interacts with the visual content 300 via the handheld controller connected with the host 100, the processor 104 may detect a raycast corresponding to the handheld controller. When the processor 104 determines that a specific button on the handheld controller is pressed and held while the raycast is pointing to the first virtual object 310, the processor 104 may determine that the first virtual object 310 has been selected (or "grabbed"). In this case, the processor 104 may track the movement of the handheld controller and accordingly move the first virtual object 310 in case of the first virtual object 310 being selected (e.g., the specific button is being pressed and held), but the disclosure is not limited thereto.

In an embodiment where the user 399 interacts with the visual content 300 via the hand gesture detected by the host 100, the processor 104 may detect a raycast 330 corresponding to the hand gesture. When the processor 104 determines that the user 399 has performed a selection operation of the hand gesture (e.g., a pinch gesture) while the raycast 330 is pointing to the first virtual object 310, the processor 104 may determine that the first virtual object 310 has been selected (or "grabbed"). In this case, the processor 104 may track the movement of the hand gesture and accordingly move the first virtual object 310 in case of the first virtual object 310 being selected (e.g., the pinch gesture is maintained while the hand gesture is moving), but the disclosure is not limited thereto.

In a second embodiment, the processor 104 may determine whether the host posture is tilted during a process of the first virtual object 310 being moved in the visual content 300. If yes, the processor 104 may accordingly tilting the first posture of the first virtual object 310 while moving the first virtual object 310; if not, the processor 104 may not tilt the first posture of the first virtual object 310.

That is, the first posture of the first virtual object 310 would be tilted during the first virtual object 310 is being moved in the visual content 300. How the first virtual object 310 is moved in the visual content 300 can be referred to the descriptions in the first embodiment, which would not be repeated herein.

In the embodiments of the disclosure, in response to determining that the first virtual object 310 has been selected or grabbed, the processor 104 may determine that the first virtual object 310 is being moved, but the disclosure is not limited thereto.

On the contrary, the first posture of the first virtual object 310 would not be tilted when the first virtual object 310 is not being moved. That is, if the first virtual object 310 is not selected and/or grabbed, the first posture of the first virtual object 310 would not be tilted along with the tilting movement of the host 100, but the disclosure is not limited thereto.

In a variation of the second embodiment, the processor 104 may provide the option 311 in the visual content 300 in response to determining that the synchronization mode associated with the first virtual object 310 is activated, and the details of the option 311 can be referred to the related description in the first embodiment.

In the embodiment, in response to determining that the option 311 in the visual content 300 is selected, the processor 104 may determine whether the host posture is tilted during a process of the first virtual object 310 being moved in the visual content 300. If yes, the processor 104 may accordingly tilt the first posture of the first virtual object 310 while moving the first virtual object 310; if not, the processor 104 may not tilt the first posture of the first virtual object 310.

In the embodiment, the option 311 may be used for allowing the user 399 to tilt the first virtual object 310 along with the host posture of the host 100 during the first virtual object 310 is being moved. That is, if the user 399 wants to tilt the first virtual object 310 via tilting the host posture of the host 100 during the first virtual object 310 is being moved, the user 399 may select/enable the option 311. In this case, the processor 104 may tilt the first posture of the first virtual object 310 according to a tilting movement of the host posture of the host 100 during the first virtual object 310 is being moved. For example, when the host 100 is detected to be tilting to the right by a certain degree during the first virtual object 310 is being moved, the processor 104 may accordingly tilt the first posture of the first virtual object 310 to the right by the certain degree, such as the scenario exemplarily shown on the right of FIG. 3. For another example, when the host 100 is detected to be tilting to the left by another degree during the first virtual object 310 is being moved, the processor 104 may accordingly tilt the first posture of the first virtual object 310 to the left by the another degree, but the disclosure is not limited thereto.

On the other hand, if the user 399 merely wants to move the first virtual object 310 around in the visual content 300, the user 399 may not select/enable the option 311, but the disclosure is not limited thereto. In this case, the user 399 can horizontally and/or vertically move the first virtual object 310 to any desired position in the visual content 300 via, for example, a hand gesture and/or the handheld controller connected to the host 100.

In one embodiment, after the synchronization mode associated with the first virtual object 310 is activated, the processor 104 may further show a button 312, wherein the button 312 may allow the user 399 to fix the first posture of the first virtual object 310. In this case, when the user 399 determines that the first posture of the first virtual object 310 has been properly adjusted, the user 399 may trigger the button 312. Accordingly, the processor 104 would determine that the posture adjustment of the synchronization mode associated with the first virtual object 310 is finished and fix the first posture of the first virtual object 310. In this case, the first posture (e.g., the position and/or the orientation) of the first virtual object 310 would not be further adjusted.

Accordingly, the user 399 can adjust the first posture of the first virtual object 310 to be a desired posture, such that the user 399 can watch (the multimedia content shown in) the first virtual object 310 in a more comfortable way, even if the posture of the user 399 is not upright.

In one embodiment, during the first posture of the first virtual object 310 being adjusted, the second posture of the second virtual object 320 (e.g., the virtual object in the background of the visual content 300) would be maintained. That is, only the posture of the virtual object with activated synchronization mode would be adjusted based on the host posture of the host 100. In this case, the user 399 would feel less dizzy during adjusting the first posture of the first virtual object 310.

In one embodiment, the visual content 300 may be designed with a mechanism (e.g., a button on the first virtual object 310) for deactivating the synchronization mode associated with the first virtual object 310. If the synchronization mode associated with the first virtual object 310 is deactivated, the processor 104 may reset the first posture of the first virtual object 310 to be a default posture of the first virtual object 310. For example, the default posture of the first virtual object 310 may be the posture of the first virtual object 310 being adjusted, e.g., the first posture shown on the left part of FIG. 3, but the disclosure is not limited thereto.

Figure 4:
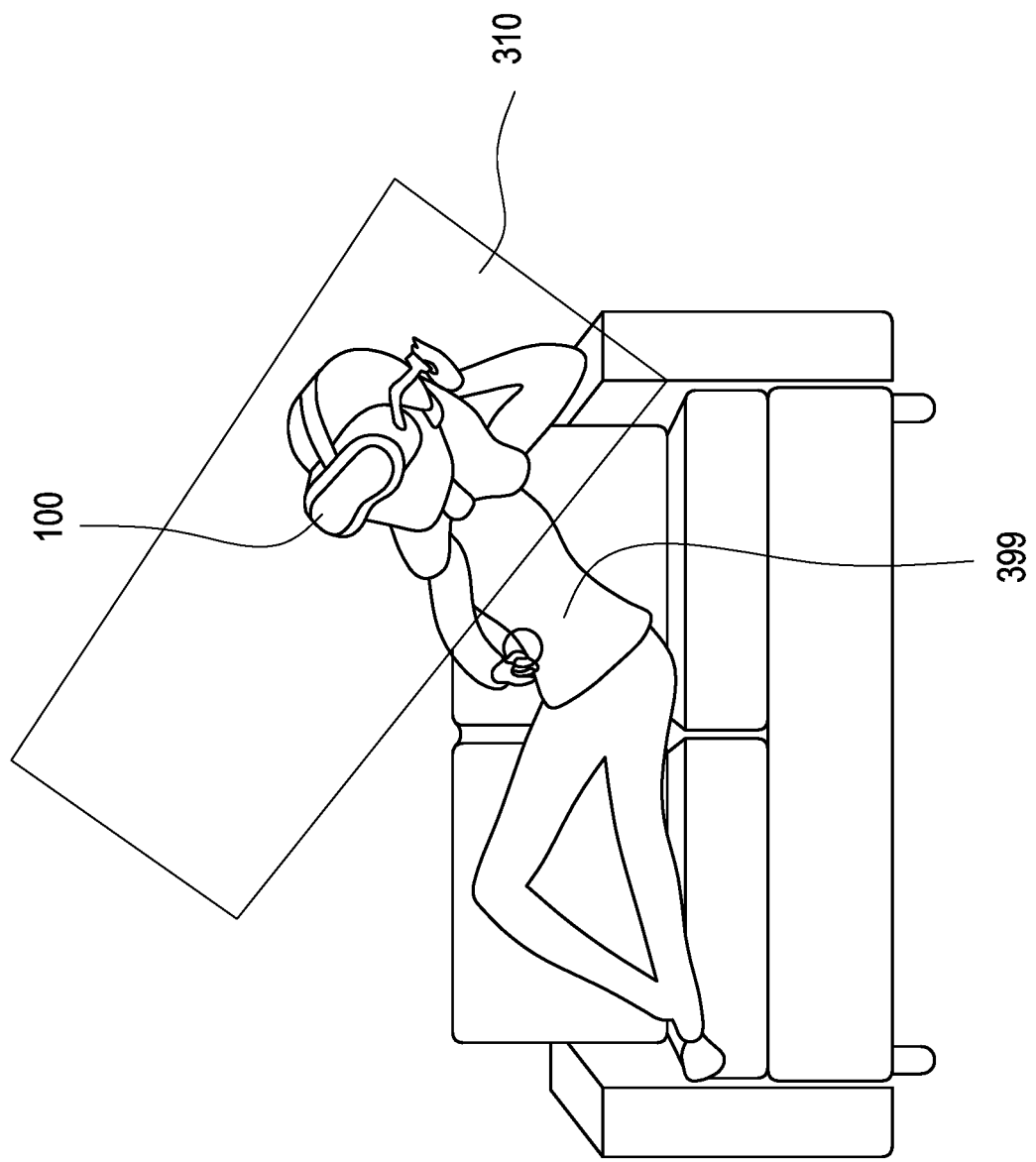
FIG. 4 shows an application scenario according to an embodiment of the disclosure.

See FIG. 4, which shows an application scenario according to an embodiment of the disclosure. In FIG. 4, when the user 399 wants to watch the first virtual object 310 in a relaxed posture with tilted head, the user 399 may adjust the first posture of the first virtual object 310 in advance based on the above teachings, such that the first posture of the first virtual object 310 can be, for example, as tilted as the head of the user 399. Accordingly, the visual experience of the user 399 watching the first virtual object 310 can be improved.

The disclosure further provides a computer readable storage medium for executing the method for adjusting a displayed content. The computer readable storage medium is composed of a plurality of program instructions (for example, a setting program instruction and a deployment program instruction) embodied therein. These program instructions can be loaded into the host 100 and executed by the same to execute the method for adjusting a displayed content and the functions of the host 100 described above.

In summary, the embodiments of the disclosure allow the user to adjust the posture of the virtual object with activated synchronization mode based on the host posture of the host. Accordingly, the visual experience of the user watching the first virtual object can be improved, even if the user is not in an upright posture.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for adjusting a displayed content, adapted to a host, comprising:
   displaying a visual content, wherein the visual content comprises a first virtual object and a second virtual object, wherein the host is a head-mounted display providing a reality service; and
   in response to determining that a synchronization mode associated with the first virtual object is activated, automatically adjusting a first posture of the first virtual object at least based on a host posture of the host and maintaining a second posture of the second virtual object.

2. The method according to claim 1, further comprising:
   in response to determining that a posture adjustment of the synchronization mode associated with the first virtual object is finished, fixing the first posture of the first virtual object.

3. The method according to claim 1, wherein the step of adjusting the first posture of the first virtual object at least based on the host posture of the host comprises:
   in response to determining that the host posture is tilted, accordingly tilting the first posture of the first virtual object.

4. The method according to claim 1, wherein the step of adjusting the first posture of the first virtual object at least based on the host posture of the host comprises:
   in response to determining that the host posture is tilted during a process of the first virtual object being moved in the visual content, accordingly tilting the first posture of the first virtual object while moving the first virtual object.

5. The method according to claim 4, further comprising:
   in response to determining that the host posture is tilted while the first virtual object is not being moved, not tilting the first posture of the first virtual object.

6. The method according to claim 4, wherein the host is connected to a handheld controller, and the method further comprises:

in response to determining that a selection operation on the handheld controller is triggered while a raycast corresponding to the handheld controller in the visual content is pointing to the first virtual object, determining that the first virtual object is selected; and
   moving the first virtual object in the visual content based on a movement of the handheld controller in case of the first virtual object being selected.

7. The method according to claim 4, further comprising:
   in response to determining that a selection operation of a hand gesture is detected while a raycast corresponding to the hand gesture is pointing to the first virtual object, determining that the first virtual object is selected; and
   moving the first virtual object in the visual content based on a movement of the hand gesture in case of the first virtual object being selected.

8. The method according to claim 1, further comprising:
   in response to determining that the synchronization mode associated with the first virtual object is activated, providing an option in the visual content;
   in response to determining that the option in the visual content is selected, tilting the first posture of the first virtual object according to a tilting movement of the host posture of the host.

9. The method according to claim 1, further comprising:
   in response to determining that the synchronization mode associated with the first virtual object is activated, providing an option in the visual content;
   in response to determining that the option in the visual content is selected, determining whether the host posture is tilted during a process of the first virtual object being moved in the visual content;
   in response to determining that the host posture is tilted during the process of the first virtual object being moved to the position in the visual content, accordingly tilting the first posture of the first virtual object while moving the first virtual object.

10. The method according to claim 1, further comprising:
    in response to determining that the synchronization mode associated with the first virtual object is deactivated, resetting the first posture of the first virtual object to be a default posture of the first virtual object.

11. The method according to claim 1, wherein the first virtual object is a foreground object in the visual content, and the second virtual object is a background object in the visual content.

12. The method according to claim 1, wherein the first virtual object is a window for showing a multimedia content.

13. The method according to claim 1, wherein the visual content is one of a virtual reality visual content, an augmented reality visual content, a mixed reality visual content, and an extended reality visual content.

14. A host, comprising:
    a non-transitory storage circuit, storing a program code;
    a processor, coupled to the non-transitory storage circuit and accessing the program code to perform:
    displaying a visual content, wherein the visual content comprises a first virtual object and a second virtual object, wherein the host is a head-mounted display providing a reality service; and
    in response to determining that a synchronization mode associated with the first virtual object is activated, automatically adjusting a first posture of the first virtual object at least based on a host posture of the host and maintaining a second posture of the second virtual object.

15. The host according to claim 14, wherein the processor further performs:
   in response to determining that a posture adjustment of the synchronization mode associated with the first virtual object is finished, fixing the first posture of the first virtual object.

16. The host according to claim 14, wherein the processor performs:
   in response to determining that the host posture is tilted during a process of the first virtual object being moved to a position in the visual content, accordingly tilting the first posture of the first virtual object while moving the first virtual object; and
   in response to determining that the host posture is tilted while the first virtual object is not being moved, not tilting the first posture of the first virtual object.

17. The host according to claim 14, wherein the processor further performs:
   in response to determining that the synchronization mode associated with the first virtual object is activated, providing an option in the visual content;
   in response to determining that the option in the visual content is selected, determining whether the host posture is tilted during a process of the first virtual object being moved in the visual content;
   in response to determining that the host posture is tilted during the process of the first virtual object being moved to the position in the visual content, accordingly tilting the first posture of the first virtual object while moving the first virtual object.

18. The host according to claim 14, wherein the processor further performs:
   in response to determining that the synchronization mode associated with the first virtual object is deactivated, resetting the first posture of the first virtual object to be a default posture of the first virtual object.

19. A non-transitory computer readable storage medium, the computer readable storage medium recording an executable computer program, the executable computer program being loaded by a host to perform steps of:
   displaying a visual content, wherein the visual content comprises a first virtual object and a second virtual object, wherein the host is a head-mounted display providing a reality service; and
   in response to determining that a synchronization mode associated with the first virtual object is activated, automatically adjusting a first posture of the first virtual object at least based on a host posture of the host and maintaining a second posture of the second virtual object.

* * * * *